US008884748B2

(12) United States Patent
Qian et al.

(10) Patent No.: US 8,884,748 B2
(45) Date of Patent: *Nov. 11, 2014

(54) METHOD FOR AVOIDING CHILDREN TO BE LEFT IN CAR ALONE AND DEVICE THEREOF (76) Inventors: Davy Zide Qian, Arcadia, CA (US); Nicole Minhui Lu, Arcadia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 483 days.

This patent is subject to a terminal disclaimer.

(21) Appl. No.: 13/197,377

(22) Filed: Aug. 3, 2011

(65) Prior Publication Data

US 2011/0285524 A1 Nov. 24, 2011

Related U.S. Application Data (63) Continuation-in-part of application No. 12/839,288, filed on Jul. 19, 2010, now Pat. No. 8,432,271.

(60) Provisional application No. 61/229,362, filed on Jul. 29, 2009, provisional application No. 61/232,414, filed on Aug. 8, 2009, provisional application No. 61/236,069, filed on Aug. 21, 2009, provisional application No. 61/370,108, filed on Aug. 3, 2010, provisional application No. 61/380,296, filed on Sep. 6, 2010, provisional application No. 61/409,990, filed on Nov. 4, 2010, provisional application No. 61/478,560, filed on Apr. 25, 2011.

(51) Int. Cl.
*B60Q 1/00* (2006.01)
*B60K 28/06* (2006.01)
*G08B 21/22* (2006.01)
*B60Q 9/00* (2006.01)
*B60R 21/015* (2006.01)

(52) U.S. Cl.
CPC ............... *B60Q 9/00* (2013.01); *B60K 28/066* (2013.01); *G08B 21/22* (2013.01); *B60R 2021/01575* (2013.01)
USPC ..... 340/438; 340/425.5; 340/457; 340/457.1; 340/461

(58) Field of Classification Search
USPC .......... 340/438, 425.5, 457, 457.1, 461, 525, 340/573.1
See application file for complete search history.

(56) References Cited

U.S. PATENT DOCUMENTS

| | | | | |
|---|---|---|---|---|
| 5,402,108 A | * | 3/1995 | Tabin et al. | 340/575 |
| 6,008,732 A | * | 12/1999 | Lam | 340/815.4 |
| 8,432,271 B2 | * | 4/2013 | Qian et al. | 340/438 |
| 2003/0222775 A1 | * | 12/2003 | Rackham et al. | 340/457 |
| 2005/0030188 A1 | * | 2/2005 | Flanagan et al. | 340/667 |
| 2010/0063904 A1 | * | 3/2010 | Ronen et al. | 705/30 |
| 2011/0285524 A1 | * | 11/2011 | Qian et al. | 340/457 |

* cited by examiner

*Primary Examiner* — Daryl Pope
(74) *Attorney, Agent, or Firm* — Tianhua Gu; Global IP Services (57) ABSTRACT A method for preventing children from being left in a car and a device thereof. The method comprises testing a <starting signal>, a <trip ending signal> and driver judges if have children, send these information to a controlling device, if have children in car then the controlling device sends a action order to preventing device to take action to prevent the children being left in the car. A driver alarm for preventing children from being left in a car includes a power device, car startup measuring device, inquiring device, trip ending measuring device, preventing device and controlling device.

19 Claims, 8 Drawing Sheets

METHOD FOR AVOIDING CHILDREN TO BE LEFT IN CAR ALONE AND DEVICE THEREOF

CROSS REFERENCE TO RELATED PATENT APPLICATION

The present application is a continuation in part application of the pending U.S. application Ser. No. 12/839,288, which claims priorities of the U.S. provisional applications No. 61/229,362 filed Jul. 29, 2009, No. 61/232,414 filed Aug. 8, 2009 and No. 61/236,069 filed Aug. 23, 2009, which applications are incorporated herein by reference.

The present application also claims priorities of U.S. provisional applications No. 61/370,108 filed Aug. 3, 2010, No. 61/380,296 filed Sep. 6, 2010, No. 61/409,990 filed Nov. 4, 2010 and 61/478,560 filed Apr. 25, 2011, which applications are incorporated herein by reference.

FIELD OF INVENTION

This invention belongs to an electronic communication field. More practically, this invention relates to an area of electronic alarm device.

BACKGROUND OF THE INVENTION

It is dangerous to leave children alone in a locked car, and especially in the summer or winter. That many children have died from heat stroke, hypothermia or suffocation in hot (or freezing) cars has caused tragedies in many families. Most of those tragedies were not caused intentionally by the acts of parents or drivers with children, but by their negligence and forgetfulness. Sometimes, a parent brought a kid out to shop, and the kid fell into a sleep in the car, the busy parent rushed to go to shopping since a lot of housework was waiting for him or her, and forgot the kid(s) who were sleeping in the cars. The parent locked the car, and as a result, caused a great misfortune, the kid suffocated and died in the extremely hot and locked car. The parent had to take legal responsibilities for the act that he or she caused. In some cases, those parents not only lost their kids, but also ruined their families.

People wish to have a driver alarm for preventing children from being left in the car. The driver's alarm should automatically remind the parent/driver about having kids inside the car when leaving the car; therefore, such tragedies can be avoided. Thus, the driver alarm for preventing children being locked inside of a car is very important.

Some of these kinds of inventions were made before; however no one is seen in the market. The Main reason is these inventions are complicated, and especially, too complicated to install; thus cannot be adopted by the public.

For those reasons, it is important to invent a method for preventing children from being left in a car and a device thereof (it will be referred to as a preventing method and a driver alarm in the following discussion), which is simple to use and reliable.

SUMMARY OF THE INVENTION

The inventor discover many patent applications relating to the device alarm for preventing children from being left in car. However to date there are no this kind of device is sold in market. Main reason is that some devices are very complex in assembly with car. Other reason is that some device is simple but its work is not reliable.

The purpose of present invention is to find a simple and reliable method to prevent children from being left in car. The other purpose is to design a simple and reliable warning device to prevent children from being left in car.

The new feature of present invention which is different from existed prior art is to combine driver's judgment if have children in car with a reminder device to realize the purpose of invention described above. A method and a device for preventing children from being left in car achieved in this way are simple and reliable.

A Method for Children from being Left Inside of a Car Comprising Following Steps:
tests a <starting signal> from a car being started up or will be started up, sends the <starting signal> to a controlling device;
after receiving the <starting signal> a controlling device issues an <if have children in car> to a inquiring device to ask a driver;
the driver answers the inquiring <if have children in car> by making a response to a inquiring device, the answer is:
<yes>—have children in the car, or
<no>—no children in the car, or
<no response>—acquiescence having children in the car;
tests a <trip ending signal> from the car, sends the <trip ending signal> to the controlling device;
the controlling device issues a <action> order to a preventing device for preventing children from being left inside of the car if have saved <yes> answer or <no response> answer from the driver and receive <trip ending signal>;
the preventing device take action to prevent children from being left inside of the car,
after the risk of children leaving in car singly is released, the method is stopped by the driver.

As an alter method, the first step of testing can be canceled. When start up the car the driver can enter an answer to if have children in car into the control device, the following steps are the same as the original process.

A Driver Alarm for Preventing Children from being Left Inside of a Car Includes:
a power device for providing electrical power to the driver alarm;
a car startup measuring device for measuring the car being started up by measuring car starting changing and put the signal to a controlling device;
an inquiring device for asking driver if having children in car and receiving driver's answer for this question, then put the signal to a controlling device;
a trip ending measuring device for measuring the car being stopped by measuring trip ending signal, then put the signal to a controlling device;
a preventing device for taking action to prevent children from being left inside of the car according to an order from a controlling device;
a controlling device for communicating with and controlling the car startup measuring device, inquiring device and action device;
the car startup measuring device adopts a <starting signal> and sends it to the controlling device, the controlling device issues an <if have children in car> question to the inquiring device, the driver makes a response to the inquiring device: <yes>—have children in the car, or <no>—no children in the car, or <no response> acquiescence having children in the car, the trip ending measuring device issue a trip ending signal to the controlling device when the trip ends, the controlling device issues a <action> order to the preventing device if having saved <yes> answer or <no response> answer from the inquiring device and receive <trip ending> signal, the preventing device take action to prevent children from being left inside of the car.

As an alter method, the car startup measuring device can be canceled. When start up the car the driver can enter an answer to if have children in car into the control device, the other devices are the same as the original driver alarm.

A Driver Alarm for Preventing Children from being Left Inside of a Car by Testing the Voltage of a Cigarette-Lighter Socket in a Car:

The inventor discovers that the voltage of a cigarette-lighter socket in a car rises when the car engine is turned on and declines when the engine is turned off. The inventor creatively connects the situations together that when the driver starts the car engine causing the voltage of cigarette-lighter socket to rise, it means the car will be driven away and it's a good time to find out from the driver whether there are any children (or pets) going along inside the car; and when the driver stops the car engine causing the voltage of the cigarette-lighter socket to drop, it means the driver is about to leave the car and it's a good time to remind the driver about not forgetting and leaving any children/pets behind in a locked car. Thereby, the inventor can invent a driver alarm that is simple and reliable.

A driver alarm for preventing children/pets from being left inside of a car comprises: a power device, a voltage measuring device, a prompting device and a controlling device.

Furthermore, an inputting device can be added into the driver alarm.

Said power device has a plug, the plug can be inserted into a cigarette-lighter socket in a car, and the cigarette-lighter socket is used as a power source for the driver alarm.

Said voltage measuring device is used to measure the voltage change of the cigarette-lighter socket in a car and report the measured results to the controlling device. The voltage of the cigarette-lighter socket in a car rises when the engine is started; and the voltage of the cigarette-lighter socket in a car declines when the engine is turned off. The signal of voltage rising or voltage declining is sent to the controlling device, based upon which the controlling device will react to the two different conditions of the engine being started (voltage rising) or the engine being turned off (voltage declining).

Said inputting device is used for a driver to report to the controlling device whether any children or pets are inside of the car or not. The inputting device can be omitted.

Said prompting device sends warning sounds (or verbal questions/prompts) to the driver asking whether children/pets are in the car after the engine is started; and when the engine is turned off it should make verbal warnings/reminders to the driver to avoid leaving children/pets inside a locked car— based upon the driver's response to the question initially.

Said controlling device is well programmed to control the prompting device to warn the driver about children/pets being inside of the car—at an appropriate time.

The controlling device works according to the following programming:

When the controlling device receives a <voltage rising> signal originated from the cigarette-lighter socket in the car via the voltage measuring device (indicating the engine being turned on), the controlling device immediately sends out a <query instruction> to the prompting device. The prompting device receives the <query instruction> and immediately asks the driver if there are children/pets in the car; the driver's response could be <yes> (by pushing the "Yes" button within certain number of seconds) or <no> (by pushing the "No" button within certain number of seconds) or <no response> (by not pushing any button within certain number of seconds when the driver is busy dealing with the traffic and unable to answer the question by pushing the buttons); the inputting device then reports the driver's answer/response to the controlling device.

Once the controlling device receives <yes> signal from the inputting device, the controlling device stores <yes> into the occupancy status memory register, and immediately gives out a <warning instruction> to the prompting device to warn the driver that some children are in the car.

When the controlling device receives <NO> signal from the inputting device, the controlling device sends a <Confirming instruction> to the prompting device to confirm with the driver that there are no children/pets inside the car, at that time the driver will be given a chance to make a correction by pushing the "YES" button again if s/he made a mistake. If no correction is made, then a "NO" value is saved into the occupancy status memory register.

When the controlling device receives <no response> after a certain number of seconds, it promptly sends out another <query instructions> to the prompting device to ask the driver whether there are children in the car, and after repeatedly querying two times without an answer, the controlling device will automatically assume there are children inside the car and saves a "Yes" value into the occupancy status memory register.

When the controlling device receives a <voltage declining> signal originated from the cigarette-lighter socket in the car via the voltage measuring device (indicating the engine is turned off) and retrieves a "yes" answer/value (children in car) from the occupancy memory, then the controlling device sends a "warning instruction" to the prompting device to warn the driver that the children are in the car. But if the occupancy status memory register value is found to be a "NO", then the controlling device doesn't have to do anything.

Thus, the said driver alarm is able to warn the driver that the children are in the car when the car engine is started and when the car engine is turned off.

Due to the conception of this invention, the preventing method and driver alarm designed have an important advantage, i.e. it is easy to set up and it is reliable.

The sensor testing different car starting signals and trip ending signals is a kind of maturated technique. Only needs put the sensor on necessary place and connects it with the controlling device. and then the driver alarm will work effectively from there on. The driver alarm is also designed to work in a simple and reliable way by using the voltage change (of the cigarette-lighter socket) to determine if the car engine is being started hence being driven away, or the car engine is being turned off hence indicating the driver is about to leave the car; and then based upon the driver's self report of the vehicle occupancy status (of children/pets) by pushing either the "YES" button or the "NO" button, or not pushing any bottom which defaults to the same effect of pushing the "YES" button (instead of complicated and potentially unreliable sensor system), to warn/prompt the driver to avoid leaving children/pets in a locked car.

DETAIL DESCRIPTION OF THE INVENTION

A Driver Warning Method of Children from being Left Inside of a Car. New it is Described in Detail as Follows:

First step is testing a <starting signal> from a car 10 being started up or will be started up, sends the starting signal to a controlling device 5. The methods for testing a car started up are common methods, which Can use different sensors to test different car starting signals.

FIG. 3 shows different sensors are installed different parts of car 10 to test different car starting signals. a temperature sensor 11 tests the water tank temperature rising as car starting signal. A running speed sensor 12 tests the engine starting as car starting signal. A electrical magnet field sensor 13 tests car electrical generator starting electrical magnet field change as car starting signal. A speed sensor 14 tests car speed change as car starting signal. An electrical voltage or current sensor 18, 19 tests the car starting voltage or current change as car starting signal. A door or window sensor 15, 16 tests the door or window opening or closing as car starting signal. A parking brake sensor 17 tests the parking brake action as car starting signal. and A car children chair sensor 20 tests the fixing of the car children chair 23 as car starting signal, etc. Many other testing methods for car starting are available and do not be enumerated one by one here, but they are obvious to a ordinary skill person in the field.

Many new car-selves have equipped these sensors for testing these signals. In this case, the present alarm method can use these signal provide by the car directly.

after receiving the <starting signal> a controlling device 5 issues an <if have children in car> to a inquiring device 3 to ask a driver.

Figure 3A:
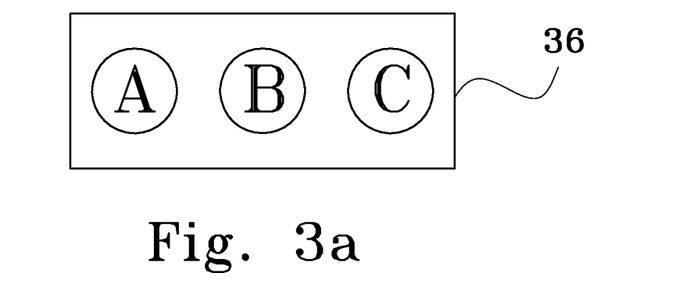
FIG. 3a is a sketch of a inquiring device having three push buttons.

The inquiring device 3 is composed of A, B, C, three push-buttons. The A push-button is designed to indicate there are children inside the car, the B push-button is designed to indicate there are no children inside the car, the C push-button is designed to stop the inquiring device. The A, B, C push-buttons are flash-buttons, and when the system needs an answer from the driver, the flash-buttons start to blink.

Figure 3B:
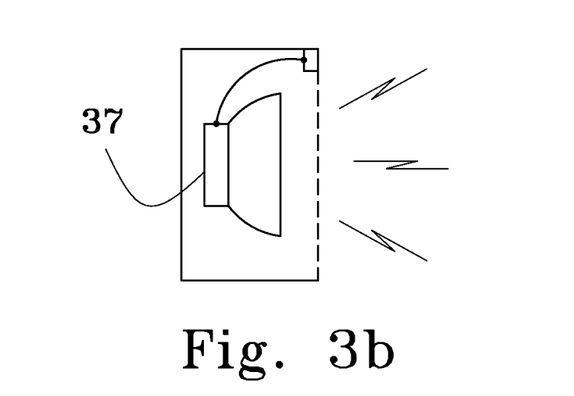
FIG. 3b is a sketch of a inquiring device having speaker and recorder.

In other embodiment, the inquiring device is composed of an audio yes or no system. a speaker controlled by the controlling device ask the driver if have children in car, the driver answer of yes or no will send back to the controlling device.

The driver answers the <if have children in car> by making a response to a inquiring device, the answer is:
<yes>—have children in the car, or
<no>—no children in the car, or
<no response>—acquiescence having children in the car.

Figure 2:
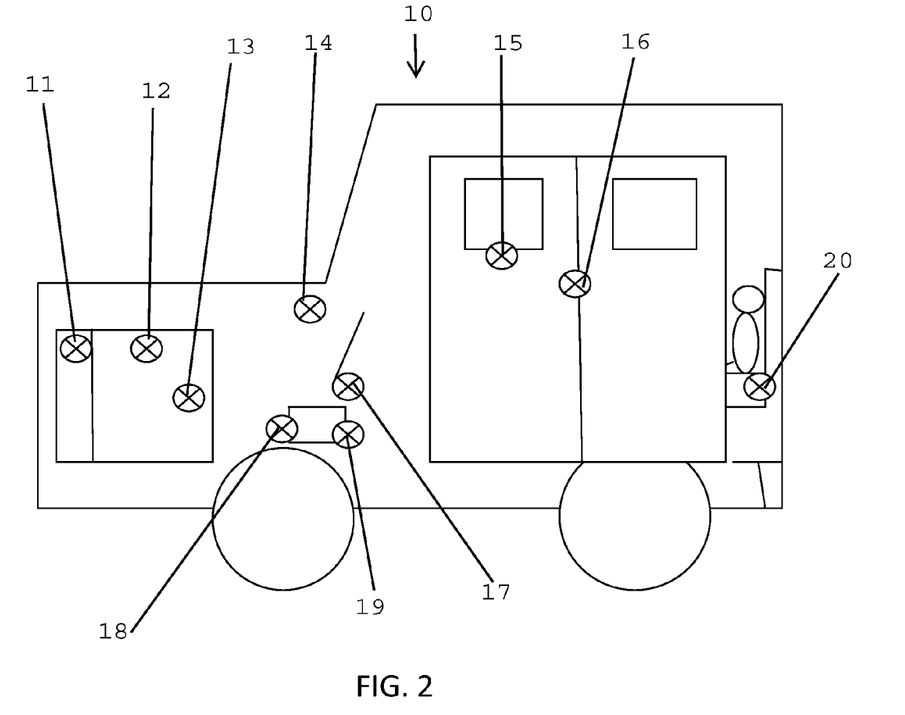
FIG. 2 is a sketch showing different testing sensors and their assembling positions for the preventing method and driver alarm.

Tests a <trip ending signal> from the car 10, sends the <trip ending signal> to the controlling device 5. The test can be done by the running speed sensor 12, which tests the engine stop as trip ending signal. The electrical magnet field sensor 13 tests the electrical magnet field of the car electrical generator changing to 0 as trip ending signal. A door or window sensor 15, 16 tests the door or window opening or closing as trip ending signal. A parking brake sensor 17 tests the parking brake 24 action as trip ending signal and, etc.

Many other testing methods for car starting are available and will not be enumerated one by one, but they are obvious to a ordinary skill person in the field.

Many new car-selves have equipped these sensors for testing these signals. In this case, the present alarm method can use these signal provide by the car directly.

The controlling device 5 issues a <action> instruction to a preventing device 6 for preventing children from being left inside of the car if saved <yes> answer or <no response> answer from the driver is existed and receive <trip ending signal>.

Figure 4:
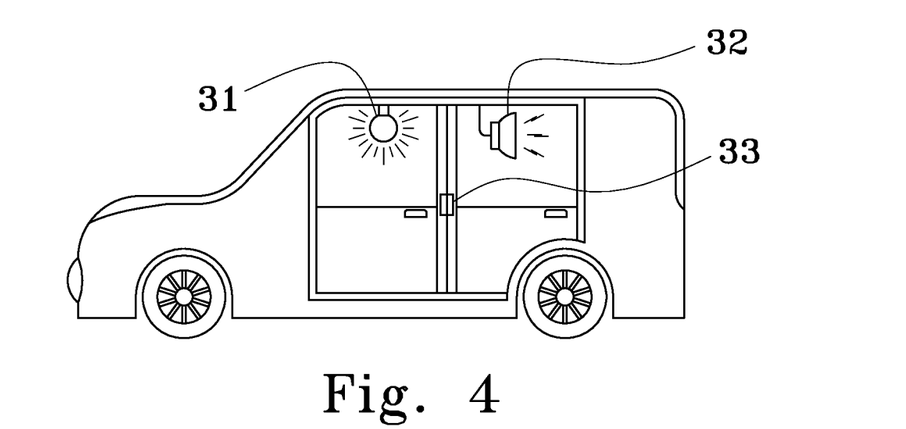
FIG. 4 is a sketch of preventing elements and their assembling positions.

The preventing device 6 take action to prevent children from being left inside of the car. The preventing action includes audio warning 32 of having children in car, visual warning 31 having children in car, verbal warning, and different preventing actions including lock 33 for locking doors in open status, and their combination.

After the risk of children singly leaving in car is released, the preventing method is stopped by the driver or automatically.

Figure 1:
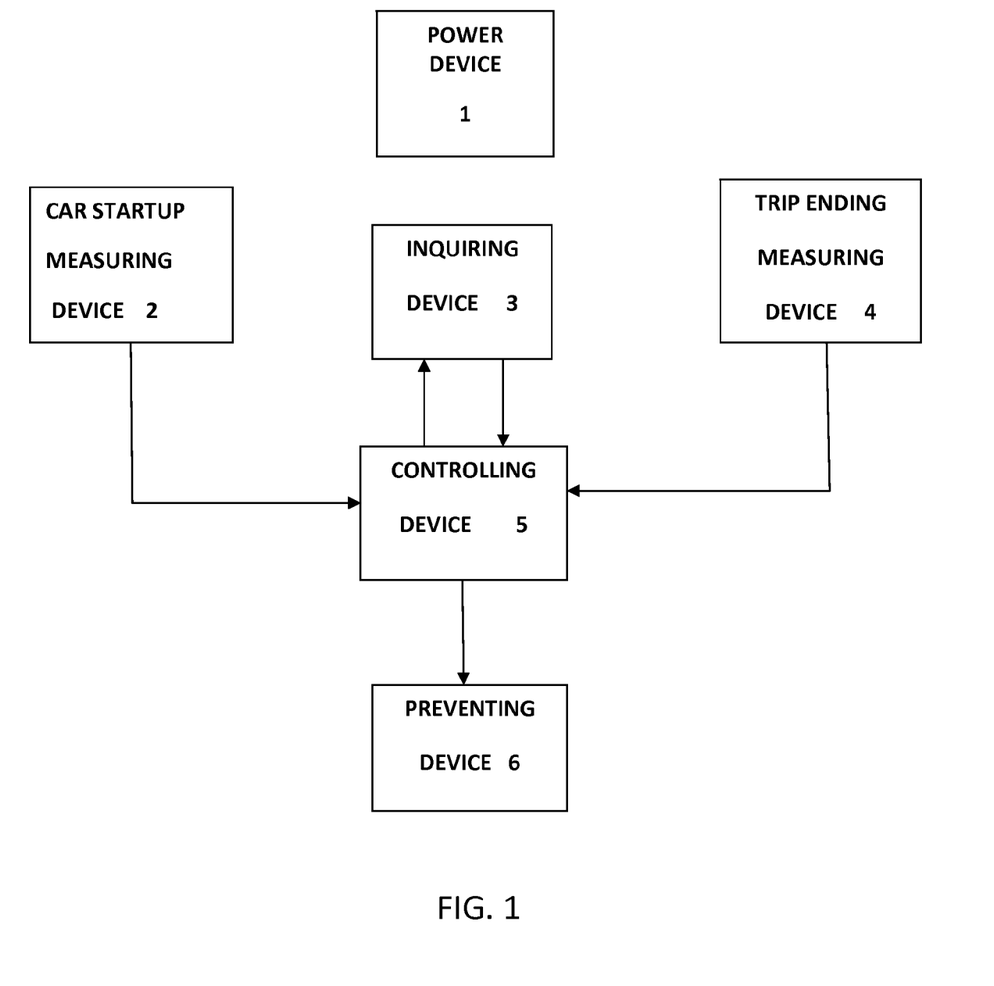
FIG. 1 is a sketch of a combination and working theory of the driver warning device for preventing children being left inside of a car of present invention.

A Driver Alarm for Preventing Children from Being Left Inside of a Car:

As showing by the FIG. 1 the driver alarm has a power device 1 for providing electrical power to the driver alarm. The driver alarm can use the car's power, also can have itself power device 1.

a car startup measuring device 2 is for measuring the car being started up by measuring car starting current changing, car starting velocity changing, car stating temperature changing, car starting electric magnetic field changing, opening of car doors or windows and fixing child seat on the car chair, etc.

FIG. 2 shows different sensors are installed different parts of car to test different car starting signals. a temperature sensor 11 tests the water tank temperature rising as car starting signal. A running speed sensor 12 tests the engine starting as car starting signal. A electrical magnet field sensor 13 tests car electrical generator starting electrical magnet field change as car starting signal. A speed sensor 14 tests car speed change as car starting signal. A electrical voltage or current sensor 18, 19 tests the car starting voltage or current change as car starting signal. A door or window sensor 15, 16 tests the door or window opening or closing as car starting signal. A parking brake sensor 17 tests the parking brake action as car starting signal and A car children chair sensor 20 tests the fixing of the car children chair 23 as car starting signal, etc.

Many other testing methods for car starting are available and will not be enumerated one by one, but they are obvious to a ordinary skill person in the field.

Many new car-selves have equipped these sensors for testing these signals. In this case, the present driver alarm can use these signal provide by the car directly.

An inquiring device 3 for asking driver if having children in car and receiving driver's answer for this question.

The inquiring device 3 is composed of A, B, C, three push-buttons 36. The A push-button is designed to indicate there are children inside the car, the B push-button is designed to indicate there are no children inside the car, the C push-button is designed to stop the inquiring device. The A, B, C push-buttons are flash-buttons, and when the system needs an answer from the driver, the flash-buttons start to blink.

Another embodiment, The inquiring device 3 is composed of an audio yes or no system (see FIG. 3b). a speaker 37 controlled by the controlling device ask the driver if have children in car, the driver answer of yes or no will send back to the controlling device 5.

the driver answers the <if have children in car> by making a response to a inquiring device, the answer is:
<yes>—have children in the car, or
<no>—no children in the car, or
<no response>—acquiescence having children in the car.

A trip ending measuring device 4 for measuring the <trip ending signal> by measuring engine stop run, opening of car doors etc., sends the <trip ending signal> to the controlling device. The test can be carried out by that the speed sensor 12 tests the engine stop as trip ending signal, the electrical magnet field sensor 13 tests car electrical generator electrical magnet field changing to 0, a door sensor 16 tests the door opening or closing and a parking brake sensor 17 tests the parking brake action as trip ending signal and, etc.

Many other testing methods for car starting are available and will not be enumerated one by one, but they are obvious to a ordinary skill person in the field.

Many new car-selves have equipped these sensors for testing these signals. In this case, the present alarm method can use these signal provide by the car directly.

an preventing device 6 for taking action to prevent children from being left inside of the car according to an order from the controlling device 5.

the preventing device 6 take action to prevent children from being left inside of the car. The preventing device includes audio warning 32 of having children in car, visual warning 31 having children in car, verbal warning 32, and different preventing actions including lock 33 for locking the car doors in opening status, and their combination.

a controlling device 5 for communicating with and controlling the car startup measuring device 1, inquiring device 3, trip ending measuring device 4 and preventing device;

the car startup measuring device adopts a <starting signal> and sends it to the controlling device, the controlling device issues an <if have children in car> question to the inquiring device, the driver make response to the inquiring device: <yes>—have children in the car, or <no>—no children in the car, or <no response> acquiescence having children in the car, the trip ending measuring device issue a trip ending signal to the controlling device when the trip ends, the controlling device issues a <action> instruction to the preventing device if saved <yes> answer or <no response> answer from the inquiring device is existed and receive <trip ending> signal, the preventing device take action to prevent children from being left inside of the car.

Figure 5:
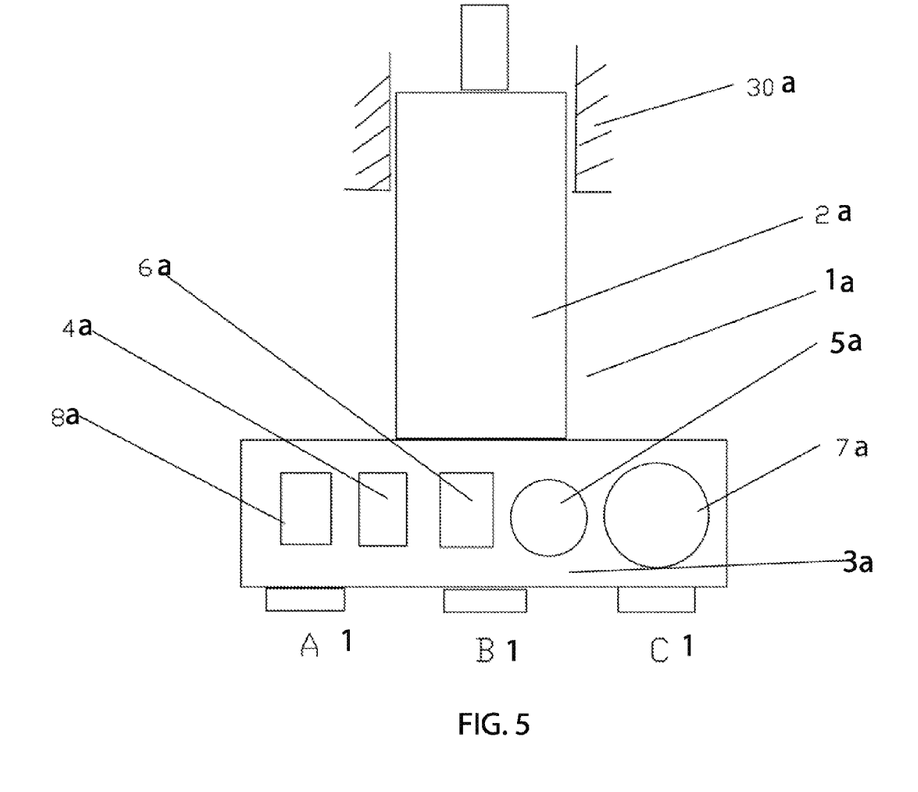
FIG. 5 is a sketch of structure of the driver alarm of present invention.

An Embodiment of A Driver Alarm for Preventing Children from Being Left Inside of a Car by Inserted into a Socket of a Cigarette-Lighter in Car As showing in FIG. 5, a driver alarm 1a has a T shape and a cylindrical plug 2a, which can be inserted into a socket 30a of a cigarette-lighter in car. A main body 3a has an inner part. The inner part contains a power device 8a, a measuring device 4a, an inputting device 6a, a prompting device 7a, a controlling device 5a and A1, B1, C1 push-buttons. The A1, B1, C1 push-buttons are located in the front of the driver alarm for the driver to respond to the query from the controlling device by pushing one of the buttons. The A1 push-button is set up to indicate the situation that children are inside the car (hence a "Yes" button); B1 push-button is set up to indicate the situation that there are NO children inside the car (hence a "No" button); C1 push-button is set up to turn off the driver alarm. The A, B, C push-buttons are flash-buttons, and when the controlling device 5 needs an answer, the buttons begin to blink.

Figure 6:
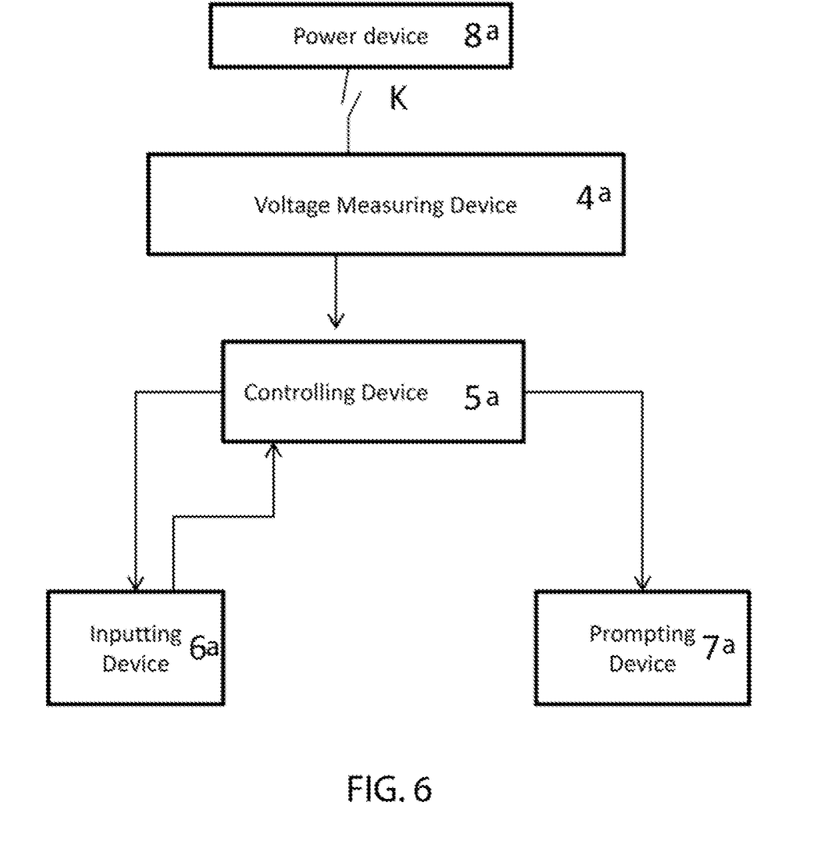
FIG. 6 is a sketch of working theory of the driver alarm of present invention.

Refer to FIG. 6, said driver alarm comprises the power device 8a, measuring device 4a, inputting device 6a, prompting device 7a and controlling device 5a. The power device 8a uses car's cigarette-lighter socket as a power source. The voltage measuring device is composed of voltage sensors. The controlling device adopts suitable electronic integrate circuits. The inputting device is composed of A1, B1, C1, three push-buttons. The A1 push-button is designed to indicate there are children inside the car, the B1 push-button is designed to indicate there are no children inside the car, the C1 push-button is designed to stop the prompting device (or the driver alarm?). The A1, B1, C1 push-buttons are flash-buttons, and when the system needs an answer from the driver, the flash-buttons start to blink. The prompting device is composed of an amplifier (loud speaker). The inputting device can be omitted.

Figure 9:
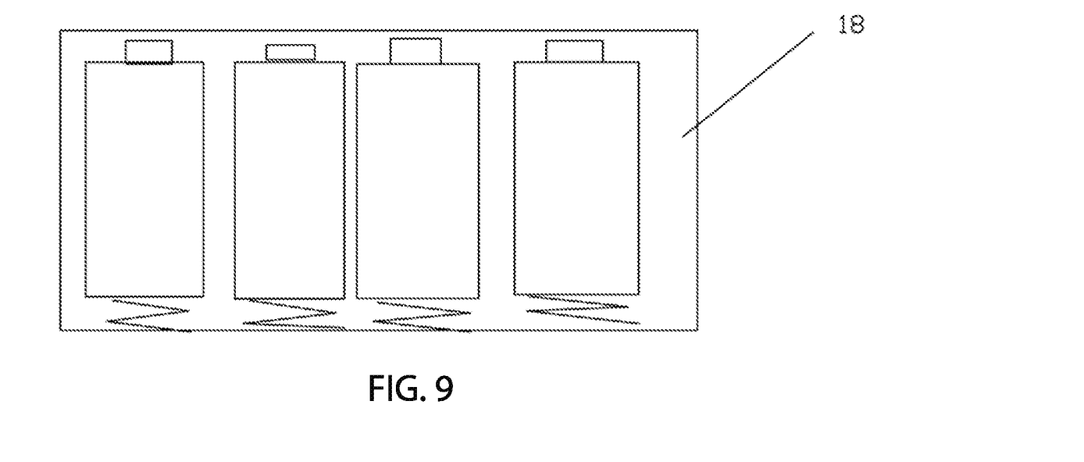
FIG. 9 is another embodiment of the driver alarm, in which a battery box is provide in the power device.

FIG. 9 shows another embodiment of the driver alarm, the power device has a battery box 18a for containing batteries or rechargeable batteries. Instead of using power from the cigarette-lighter socket in a car, by putting batteries or rechargeable batteries inside of the battery box, the power device becomes an independent power source for the driver alarm.

Figure 10:
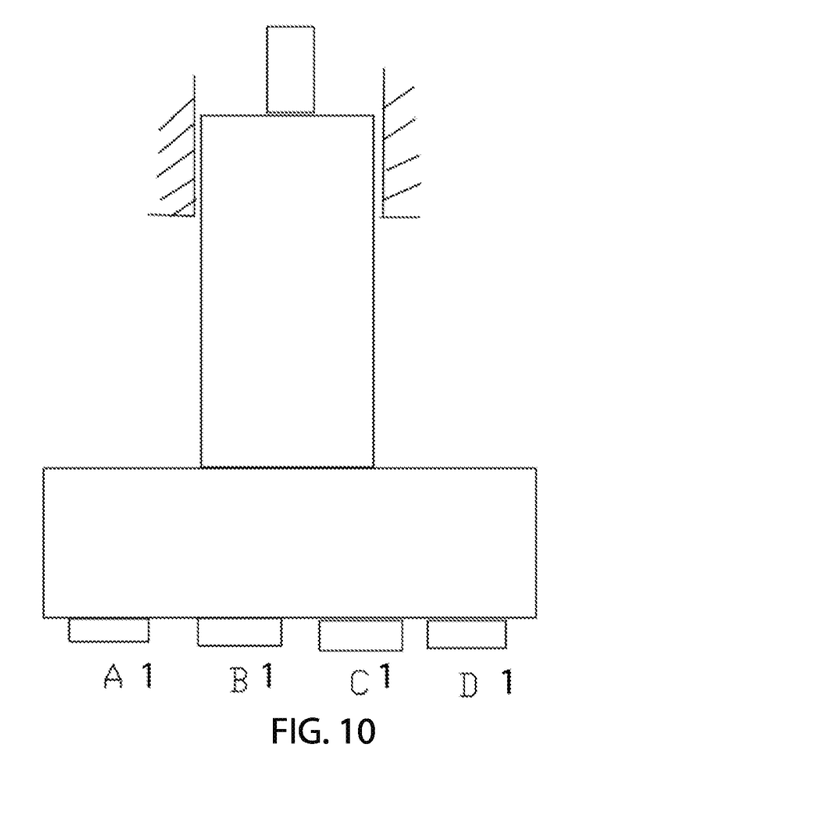
FIG. 10 is another embodiment of the driver alarm, in which a power supplying socket is provided.

FIG. 10 shows another embodiment of the driver alarm. The driver alarm in this case has a power supplying socket D1 as shown in FIG. 10. The power supplying socket D1 can be a power source in the car for other electronic devices; it brings much convenience for the driver.

Another embodiment of the driver alarm, the driver alarm has a built-in power switch K (corresponding to C button).

Figure 7:
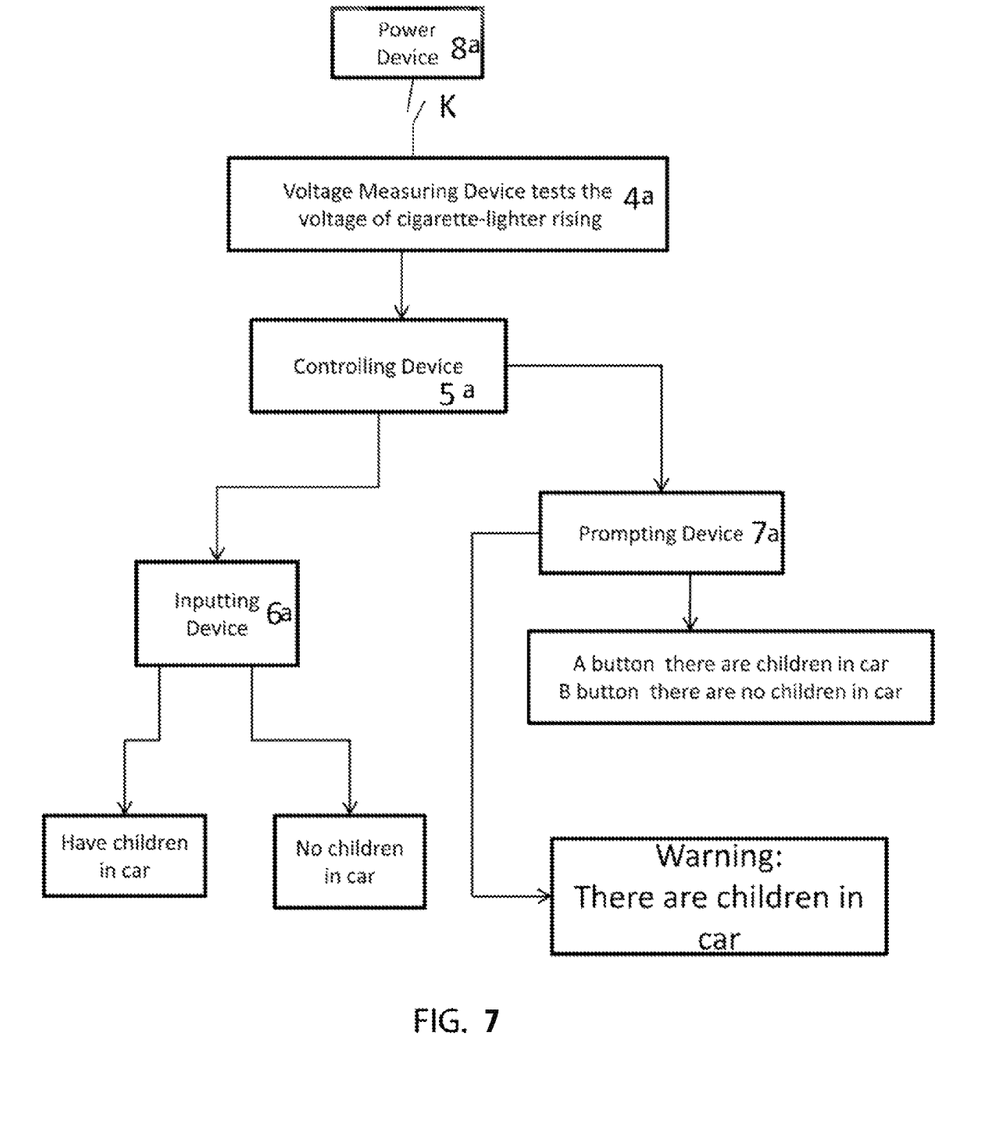
FIG. 7 is a working diagram 1A of the controlling device of the driver alarm of present invention.

Refer to FIG. 7, the driver alarm's working theory is described as the following:

Insert the cylindrical plug 2a of the driver alarm into a socket 30a of a cigarette-lighter in the car, the driver alarm is powered on and starts working. When the car's engine is started, the measuring device 4a measures a voltage rising signal from the cigarette-lighter socket, and immediately reports to the controlling device 5a that the engine is turned on. The controlling device 5a instantly sends a <query instruction> to the inputting device 6a and the prompting device 7a after receiving the report of the car engine being turned on from the voltage measuring device 4a.

Then, the three push-buttons start to blink, and at the mean time the controlling device 5a sends <query instruction> to the prompting device 7a, and then the prompting device 7a begins to speak out: "please push button A1 if children are in the car, please push button B1 if no children are in the car."

If the driver pushes button A1 (the "Yes" button), the controlling device 5a sends out a <warning instruction> to the prompting device 7a, the prompting device begins to speak: "There are children inside the car, please put seatbelt on for the children"; at the same time, the response of <pushing button A1> (children are in the car) is saved into a memory (occupancy status memory register) in the controlling device 5a.

If the driver pushes button B1, no <warning instruction> is sent out, and the response of <pushing button B> is saved into the memory (occupancy status memory register).

Figure 8:
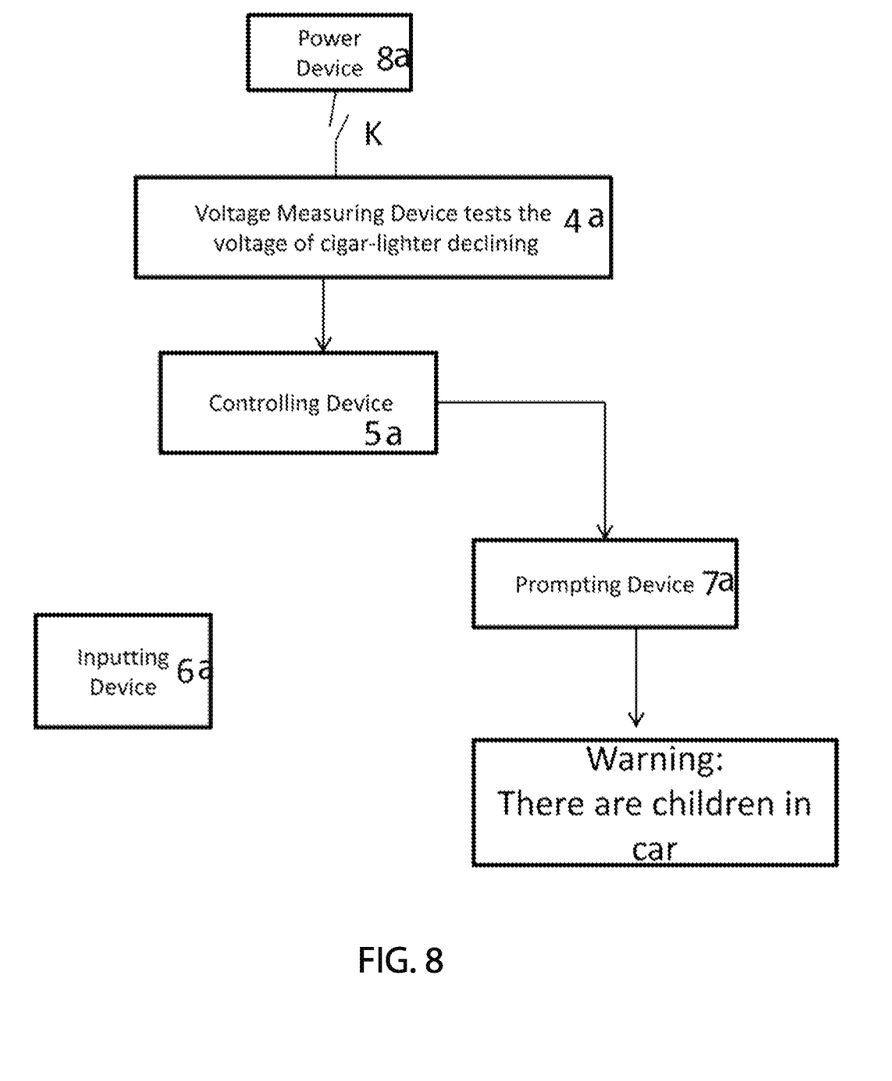
FIG. 8 is a working diagram 2A of the controlling device of the driver alarm of present invention.

As shown in FIG. 8, when the car engine is stopped, the measuring device 4a measures that the voltage of the cigarette-lighter socket in the car declines and immediately reports this to the controlling device 5a that the car engine is turned off; the controlling device 5a then starts to search and retrieve the saved value from the occupancy status memory register; if the status value is "NO" indicating there are NO children inside the car, then nothing further needs to be done; but if the status value is "Yes" indicating there ARE children inside the car, then the controlling device 5a will send a <warning instruction> to the prompting device 7a, the prompting device will begin to speak: "There are children inside the car, please bring them out of the car. It is dangerous to leave them alone inside the car." The prompting device may repeat the warning a few more times.

Button C1 is the stop button. If button C1 is pushed, then the prompting device (or the whole driver alarm) stops to speak warnings when the service is no longer needed.

If/when no power is available in the cigarette-lighter socket when the car engine is stopped, then the battery box (as shown in FIG. 9) will be a power supply source instead.

The detailed descriptions of the examples of this invention are used to help the public to understand the invention. Referring to the examples, there can be a lot of different embodiments, and these different embodiments fall in the claim scope of this invention.

What is claimed is:

1. A method for preventing children being left alone in a car, the method comprising the steps of:
    testing a starting signal, the signal being indicative of a car being started or attempted to be started, and sending the starting signal to a controlling device;
    upon receiving the starting signal, the controlling device issuing an inquiry to an inquiring device carried by a driver of the car;
    wherein once the driver receives the inquiry, the driver answers the inquiry by indicating if children are in the car, wherein
    a "yes" answer from the driver indicates that at least one child is in the car,
    a "no" answer from the driver indicates that no children are in the car, and
    "no response" from the driver indicates an answer that at least one child is in the car;
    the answer from the driver being stored in the controlling device,
    testing a trip ending signal for the car, and sending the trip ending signal to the controlling device
    the controlling device issuing an action instruction to a preventing device for preventing children from being left inside the car, if the yes answer or no response answer have been received from the driver and stored in the controlling device, while receiving the trip ending signal;
    the preventing device taking action to prevent the at least one child from being left inside the car; and
    after it is determined that no children have been left in the car, issuing a signal by the driver that stops the above stated method.

2. The method of claim 1,
    wherein the action to prevent children from being left inside of the car includes an audio warning, visual warning, verbal warning, and
    Initiating different preventing actions, including at least one of locking car doors and opening the car doors.

3. The method of claim 1,
    wherein the starting signal includes a car starting voltage change, a car starting current change, a car starting temperature change, opening of car doors or windows, fixing a child seat on a car chair, and the driver or a passenger recognizing a child in the car, and indicating such on the inquiring device.

4. The method of claim 1,
    wherein the inquiring device is a set of push-buttons, including two push-buttons, one of the two push-buttons being a "YES" button that indicates that there is at least one child in the car, and the other of the two push-buttons being a "NO" push-button that indicates that there aren't any children in the car.

5. The method of claim 1,
    wherein the trip ending signal includes an indication of a vehicle engine no longer running, a lock of the car being locked, a door of the car being opened, and the driver recognizing a passenger leaving the car, indicating such on the inquiring device.

6. The method of claim 1,
    wherein the preventing device is either:
    an electric speaker issuing a warning relating to at least one child being in the car; or
    the car having a door, and a lock of the car door being controlled by the controlling device; or
    a connector for a child seat on a chair of the car, and the connector being controlled by the controlling device.

7. A driver alarm for preventing at least one child from being left alone in a car, including:
    a driver alarm, and a power device for providing electrical power to the driver alarm;
    a car startup measuring device for measuring the following: the car being started, a car starting current change, a car starting velocity change, opening of car doors or windows, a child seat being fixed onto a car chair
    an inquiring device for sending an inquiry to a driver as to whether there are any children in the car, and for receiving a driver's response to the inquiry
    a trip ending measuring device for measuring whether the car is stopped, wherein the measuring includes measuring the following: if the engine has stopped running, and opening of car doors or windows;
    a preventing device for taking action to prevent children from being left inside of the car;
    a controlling device for communicating with and controlling the actions of the preventing device, the car startup measuring device, and the inquiring device;
    wherein the car startup measuring device adopts a starting signal of the car, and sends it to the controlling device, the controlling device issuing an inquiry of whether there are children in the car to the inquiring device, the driver responding to the inquiring device by indicating "YES", which indicates that there is at least one child in the car, "NO", which indicates that there aren't any children in the car, or the driver providing no response, which acquiesces that there are children in the car;
    a trip ending measuring device, which issues a trip ending signal to the controlling device when a trip of the car ends;
    the controlling device issuing an action instruction to the preventing device if the "YES" response or "NO" response has been received and stored in the inquiring device, in conjunction with a trip ending signal being received, such that the preventing device is instructed by the controlling device to take preventing actions to prevent the at least one child from being left in the car.

8. The driver alarm of claim 7, wherein the car startup measuring device is a sensor for testing any of: a car starting voltage changing, the car starting current changing, the car starting velocity changing, opening of car doors or windows, the child seat being fixed on the car chair, an indication from the driver or a passenger recognizing a child in the car.

9. The driver alarm of claim 7, wherein the inquiring device is a set of push-buttons, including two push-buttons, one of the two push-buttons being a "YES" button that indicates that there is at least one child in the car, and the other of the two push-buttons being a "NO" push-button that indicates that there aren't any children in the car.

10. The driver alarm of claim 7, wherein the inquiring device is a voice transmitter.

11. The driver alarm of claim 7, wherein the trip ending measuring device is a sensor to test any of: an engine of the car stopping, the application of handbrake of the car, a door on the car opening.

12. The driver alarm of claim 7, wherein the preventing device includes at least one of: an audio warning device, a visual warning device, a verbal warning device; and
    a lock for performing at least one of: closing at least one car door, and opening at least one car door.

13. The driver alarm of claim 7, wherein the controlling device is an integrated circuit.

14. A driver alarm for preventing children being left alone in a car, the alarm being inserted into a socket of a cigarette-lighter in a car, and the alarm including:
    a power device for providing electrical power to the driver alarm;
    a voltage measuring device for measuring a voltage change of the cigarette-lighter socket, and reporting the voltage change to a controlling device, wherein a rising voltage change indicating an engine of the car being started, and a declining voltage change indicating the engine being turned off;
    a prompting device, which is controlled by the controlling device, for issuing a warning related to children being in the car, based on the rising or declining voltage of the cigarette-lighter socket;
    an inputting device for alerting a driver as to whether any children are left in inside the car, and reporting to the controlling device;
    wherein, when the car is started, and the voltage of the cigarette-lighter socket rises, the measuring device reports the rising voltage to the controlling device, based on the report, the controlling device then sending a query instruction to the inputting device and as well, a prompting instruction to the prompting device, to query the driver for an answer, the inputting device reports the driver's answer to the controlling device, and, based on the driver's answer being "YES", the controlling device sends a warning instruction to the prompting device to issue a warning relating to children being in the car;
    when the car engine stops, and the voltage of the cigarette-lighter socket declines, the measuring device reports the declining voltage of the cigarette-lighter socket to the controlling device, such that the controlling device sends a warning instruction to the prompting device to issue a warning relating to children being the in the car, if the driver's answer is "YES".

15. The driver alarm of claim 14, wherein the said power device has a plug, which can be inserted into the cigarette-lighter socket in the car, and the cigarette-lighter socket thereby providing a power source for the driver alarm.

16. The driver alarm of claim 14, wherein the power device has a battery box, said power device becoming an independent electronic power source for said driver alarm, by inserting batteries or rechargeable batteries into the battery box.

17. The driver alarm of claim 14, wherein said prompting device has a power switch to cut off power, and stopping the prompting device.

18. The driver alarm of claim 14, wherein the inputting device has two push-buttons, one button being a "YES" push-button which indicates that there is at least one child in the car, and the other being button being a "NO" push-button which indicates that there are no children in the car.

19. The driver alarm of claim 15, wherein a stop button can be added to the inputting device, such that, when the driver pushes the stop button down, this causes the prompting device to stop giving out a prompting sound.

\* \* \* \* \*